US011866295B2

(12) United States Patent
Nagarajan et al.

(10) Patent No.: US 11,866,295 B2
(45) Date of Patent: Jan. 9, 2024

(54) ACTIVE BRAKING FOR IMMEDIATE STOPS

(71) Applicant: OTIS Elevator Company, Farmington, CT (US)

(72) Inventors: Prasanna Nagarajan, Farmington, CT (US); David Ginsberg, Granby, CT (US); Shashank Krishnamurthy, Glastonbury, CT (US); Daryl J. Marvin, Farmington, CT (US); Ronnie E. Thebeau, Haddam, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1266 days.

(21) Appl. No.: 16/105,581

(22) Filed: Aug. 20, 2018

(65) Prior Publication Data

US 2020/0055693 A1 Feb. 20, 2020

(51) Int. Cl.

| | |
|---|---|
| ***B66B 1/32*** | (2006.01) |
| ***B66B 5/00*** | (2006.01) |
| ***B66B 5/02*** | (2006.01) |
| *B66B 5/04* | (2006.01) |

(52) U.S. Cl.

CPC .............. *B66B 1/32* (2013.01); *B66B 5/0031* (2013.01); *B66B 5/0037* (2013.01); *B66B 5/02* (2013.01); *B66B 5/04* (2013.01)

(58) Field of Classification Search

CPC ....... B66B 5/02–027; B66B 5/04; B66B 5/06; B66B 1/28–32

See application file for complete search history.

(56) References Cited

U.S. PATENT DOCUMENTS

| | | |
|---|---|---|
| 5,648,644 A | 7/1997 | Nagel |
| 5,893,432 A | 4/1999 | Nguyen et al. |

(Continued)

FOREIGN PATENT DOCUMENTS

| | | |
|---|---|---|
| CN | 101301977 A | 11/2008 |
| CN | 101588979 A | 11/2009 |

(Continued)

OTHER PUBLICATIONS

European Search Report for European Application No. 19192712.8; Application Filing Date: Aug. 20, 2019; dated Jul. 10, 2020, 10 pages.

(Continued)

*Primary Examiner* — Christopher Uhlir
(74) *Attorney, Agent, or Firm* — CANTOR COLBURN LLP

(57) ABSTRACT

An elevator system control system is provided and includes a sensor system configured to sense elevator car conditions, a safety system signaling element to generate a safety signal indicative of an incident and a control system configured to react to the safety system signal. When the control system receives the safety signal indicating that an incident has occurred that requires engagement of at least one of primary and secondary brakes, the control system controls a deceleration rate during the incident by operating the primary brake, determining whether the deceleration rate is within a target range and adjusting the deceleration rate based on signals from the sensor system.

14 Claims, 5 Drawing Sheets

(56) References Cited

U.S. PATENT DOCUMENTS

| | | | | |
|---|---|---|---|---|
| 6,631,789 | B1 * | 10/2003 | de Jong | B66B 5/00 187/349 |
| 6,802,395 | B1 | 10/2004 | Helstrom et al. | |
| 7,353,916 | B2 | 4/2008 | Angst | |
| 7,730,998 | B2 | 6/2010 | Takahashi et al. | |
| 7,938,231 | B2 | 5/2011 | Ueda et al. | |
| 8,235,180 | B2 | 8/2012 | Kattainen et al. | |
| 8,297,411 | B2 | 10/2012 | Hashimoto et al. | |
| 8,752,677 | B2 * | 6/2014 | Harkonen | B66B 5/04 187/391 |
| 8,890,448 | B2 | 11/2014 | Putkinen et al. | |
| 9,227,815 | B2 * | 1/2016 | Martinelli | B66B 1/32 |
| 9,469,504 | B2 | 10/2016 | Hopp | |
| 9,708,157 | B2 | 7/2017 | Porta et al. | |
| 9,873,591 | B2 | 1/2018 | Kattainen et al. | |
| 2013/0025974 | A1 | 1/2013 | Piech et al. | |
| 2016/0167921 | A1 * | 6/2016 | Kattainen | B66B 1/24 187/289 |
| 2016/0194180 | A1 * | 7/2016 | Kubota | B66D 5/08 187/277 |
| 2017/0166418 | A1 | 6/2017 | Vakkamaki et al. | |
| 2017/0233219 | A1 * | 8/2017 | Studer | B66B 1/365 187/247 |
| 2018/0215576 | A1 | 8/2018 | Wei | |

FOREIGN PATENT DOCUMENTS

| | | | |
|---|---|---|---|
| CN | 104444639 | A | 3/2015 |
| CN | 105555696 | A | 5/2016 |
| DE | 112009004733 | T5 | 11/2012 |
| DE | 202016101183 | U1 | 3/2017 |
| EP | 2107029 | A1 | 10/2009 |
| EP | 2246285 | A1 | 11/2010 |
| JP | H07206288 | A | 8/1995 |
| JP | H0840658 | A | 2/1996 |
| WO | 2016156658 | A1 | 10/2016 |

OTHER PUBLICATIONS

Search Report issued in European Patent Application No. 23160727.6; Application Filing Date Mar. 8, 2023; dated Jun. 26, 2023 (7 pages).

* cited by examiner

ACTIVE BRAKING FOR IMMEDIATE STOPS

BACKGROUND

The following description relates to elevator systems and, more specifically, to an elevator system with active braking capability for immediate stops.

Elevator systems are typically deployed in multi-floor buildings to transport individuals, luggage and certain other types of loads from floor to floor. A given elevator system can include multiple elevators and, in some cases, one or more freight elevators. The multiple elevators and the freight elevator can each include an elevator car that moves upwardly and downwardly through a hoistway, a driving element that drives the movement of the elevator car and a control system that controls the driving element. The multiple elevators and the freight elevator can also include safety features, such as a set of brakes. The brakes typically operate by engaging with a guide rail when a speed of the corresponding elevator exceeds a predefined level in order to generate an amount of friction which is sufficient to stop the elevator.

Generally, elevator brakes have high brake torques and a relatively high characteristic coefficient of belt friction. As a result, the elevator brakes tend to cause hard stops of their elevators in case an immediate stop is required. That is, if there is an emergency situation or power outage, elevator brakes perform the immediate stop and, due to the characteristics mentioned above, the resulting effect is high deceleration rates of the elevators. This can lead to passenger discomfort for any passengers in the elevator.

BRIEF DESCRIPTION

According to an aspect of the disclosure, an elevator system control system is provided and includes a sensor system configured to sense elevator car conditions, a safety system signaling element to generate a safety signal indicative of an incident and a control system configured to react to the safety system signal. When the control system receives the safety signal indicating that an incident has occurred that requires engagement of at least one of primary and secondary brakes, the control system controls a deceleration rate during the incident by operating the primary brake, determining whether the deceleration rate is within a target range and adjusting the deceleration rate based on signals from the sensor system.

In accordance with additional or alternative embodiments, the control system includes a safety controller that operates the primary and secondary brakes in accordance with elevator car condition data and the safety signal.

In accordance with additional or alternative embodiments, the safety controller includes a calculation unit to calculate at least one of a velocity, an acceleration and a deceleration of the elevator car in accordance with the elevator car condition data, an electronic braking unit to operate a driving machine as the primary or secondary brake, a brake control unit to operate a braking assembly as the primary or secondary brake and a safety monitor and control logic unit to determine which of the driving machine and the braking assembly is to be operated as the primary and the secondary brake and to control the electronic braking unit and the brake control unit in accordance with calculations of the calculation unit, the safety signal, elevator system information and a brake command.

In accordance with additional or alternative embodiments, a drive component is configured to operate the driving machine and the braking assembly. The safety controller includes a calculation unit to calculate at least one of a velocity, an acceleration and a deceleration of the elevator car in accordance with the elevator car condition data and a safety monitor and control logic unit which is receptive of calculations of the calculation unit, the safety signal and elevator system information. The safety controller instructs the drive component in accordance with the calculations of the calculation unit, the safety signal and the elevator system information to operate a driving machine and a braking assembly as the primary or the secondary brake.

In accordance with additional or alternative embodiments, a drive component is configured to normally operate a driving machine and a braking assembly autonomously. The safety controller instructs the drive component during an emergency incident in accordance with the calculations of the calculation unit, the safety signal and elevator system information to operate the driving machine and the braking assembly as the primary or the secondary brake.

In accordance with additional or alternative embodiments, the safety controller resides in a drive component which comprises a controller receptive of the elevator car condition data and a power section configured to normally operate a driving machine and a braking assembly autonomously. The safety controller includes a calculation unit to calculate at least one of a velocity, an acceleration and a deceleration of the elevator car in accordance with the elevator car condition data and a safety monitor and control logic unit which is receptive of calculations of the calculation unit, the safety signal and elevator system information. The safety controller instructs the power section during an emergency incident in accordance with the calculations of the calculation unit, the safety signal and the elevator system information to operate the driving machine and the braking assembly as the primary or the secondary brake.

In accordance with additional or alternative embodiments, the adjusting of the deceleration rate includes increasing or decreasing the deceleration rate.

According to another aspect of the invention, an elevator system is provided and includes an elevator car, a driving machine to drive elevator car movements, a braking assembly to apply a braking force in opposition to the elevator car movements and a control system configured to control a deceleration rate during an incident requiring engagement of at least one of primary and secondary brakes to decelerate the elevator car movements by operating the driving machine or the braking assembly as the primary brake, determining whether the deceleration rate is within a target range and adjusting the deceleration rate in an event the deceleration rate is outside the target range.

In accordance with additional or alternative embodiments, the control system includes a sensor system configured to sense a condition of the elevator car and a safety system signaling element to generate a safety signal indicative of the incident.

In accordance with additional or alternative embodiments, the control system includes a safety controller.

In accordance with additional or alternative embodiments, the safety controller operates the driving machine and the braking assembly in accordance with elevator car condition data, a safety signal indicative of the incident and elevator system information.

In accordance with additional or alternative embodiments, the safety controller includes a calculation unit to calculate at least one of a velocity, an acceleration and a deceleration of the elevator car in accordance with elevator car condition data, an electronic braking unit to operate the driving machine as the primary or secondary brake, a brake control unit to operate the braking assembly as the primary or secondary brake and a safety monitor and control logic unit to determine which of the driving machine and the braking assembly is to be operated as the primary and the secondary brake and to control the electronic braking unit and the brake control unit in accordance with calculations of the calculation unit, a safety signal, elevator system information and a brake command.

In accordance with additional or alternative embodiments, a drive component is receptive of elevator car condition data and configured to operate the driving machine and the braking assembly. The safety controller includes a calculation unit to calculate at least one of a velocity, an acceleration and a deceleration of the elevator car in accordance with the elevator car condition data and a safety monitor and control logic unit which is receptive of calculations of the calculation unit, a safety signal and elevator system information. The safety controller instructs the drive component in accordance with the calculations of the calculation unit, the safety signal and the elevator system information to operate the driving machine and the braking assembly as the primary or the secondary brake.

In accordance with additional or alternative embodiments, a drive component is receptive of elevator car condition data and configured to normally operate the driving machine and the braking assembly autonomously. The safety controller includes a calculation unit to calculate at least one of a velocity, an acceleration and a deceleration of the elevator car in accordance with the elevator car condition data and a safety monitor and control logic unit which is receptive of calculations of the calculation unit, a safety signal and elevator system information. The safety controller instructs the drive component during an emergency incident in accordance with the calculations of the calculation unit, the safety signal and the elevator system information to operate the driving machine and the braking assembly as the primary or the secondary brake.

In accordance with additional or alternative embodiments, the safety controller resides in a drive component which comprises a controller receptive of the elevator car condition data and a power section configured to normally operate the driving machine and the braking assembly autonomously. The safety controller includes a calculation unit to calculate at least one of a velocity, an acceleration and a deceleration of the elevator car in accordance with elevator car condition data and a safety monitor and control logic unit which is receptive of calculations of the calculation unit, a safety signal and elevator system information. The safety controller instructs the power section during an emergency incident in accordance with the calculations of the calculation unit, the safety signal and the elevator system information to operate the driving machine and the braking assembly as the primary or the secondary brake.

In accordance with additional or alternative embodiments, the adjusting of the deceleration rate includes increasing or decreasing the deceleration rate.

According to another aspect of the disclosure, a method of operating an elevator system is provided and includes actively controlling a deceleration rate during an incident that requires engagement of at least one of primary and secondary brakes to decelerate an elevator by operating a primary brake, determining whether the deceleration rate is within a target range and adjusting the deceleration rate when the declaration rate is outside the target range.

In accordance with additional or alternative embodiments, the active controlling comprises stopping the elevator at a landing.

In accordance with additional or alternative embodiments, the method further includes determining that the incident is in effect and the determining includes sensing a condition of the elevator car, generating a safety signal indicative of the incident and communicating elevator system information to the elevator car.

In accordance with additional or alternative embodiments, the adjusting of the deceleration rate includes increasing or decreasing the acceleration rate.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a supervisory control device is provided for an elevator system. The supervisory control device has a high safety integrity level and actively controls a deceleration rate of an elevator in the event an immediate stop is necessary. This allows the elevator to decelerate at a relatively low rate and thereby improve passenger comfort.

Figure 1:
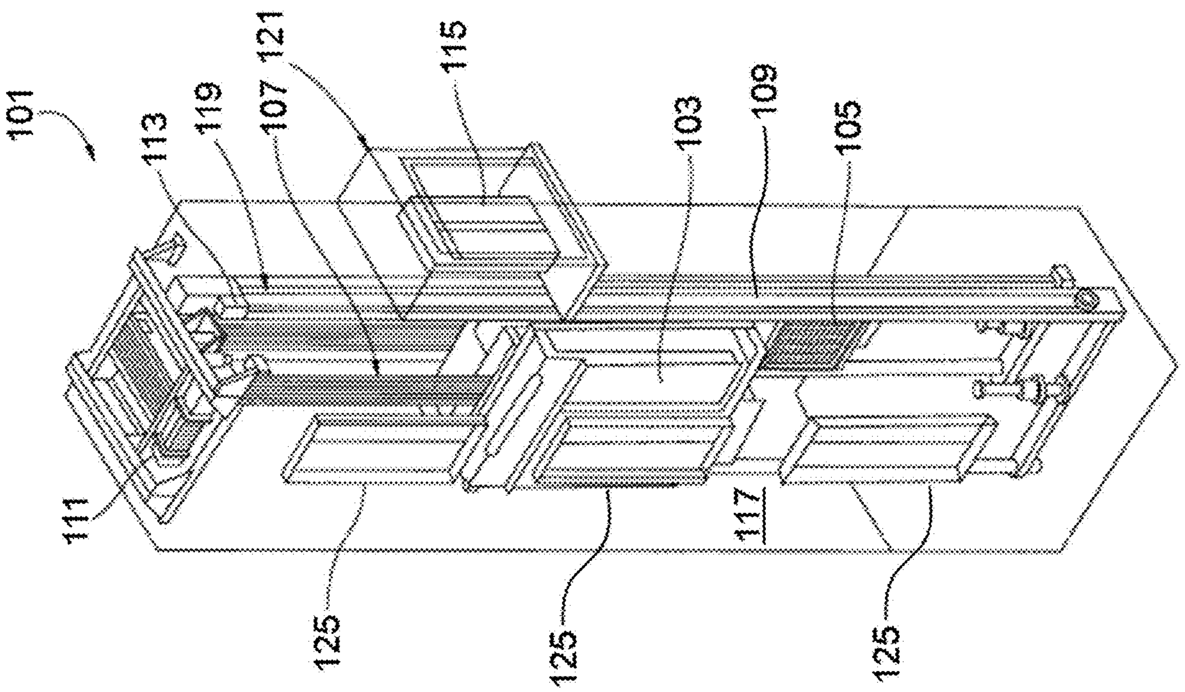
FIG. 1 is a perspective view of an elevator system in accordance with embodiments.

FIG. 1 is a perspective view of an elevator system 101 including an elevator car 103, a counterweight 105, a roping 107, a guide rail 109, a driving machine 111, a speed sensor 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the driving machine 111, which is part of an overhead structure of the elevator system 101. The driving machine 111 is configured to control movement between the elevator car 103 and the counterweight 105. The speed sensor 113 may be mounted on an upper sheave of a speed-governor system 119 and may be configured to provide position signals related to a position of the elevator car 103 within the elevator shaft 117. In other embodiments, the speed sensor 113 may be directly mounted to a moving component of the driving machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the driving machine 111 to control the acceleration, deceleration, leveling, stopping, etc. of the elevator car 103. The controller 115 may also be configured to receive speed signals from the speed sensor 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The driving machine 111 may include a motor or similar driving mechanism. In accordance with embodiments of the disclosure, the driving machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
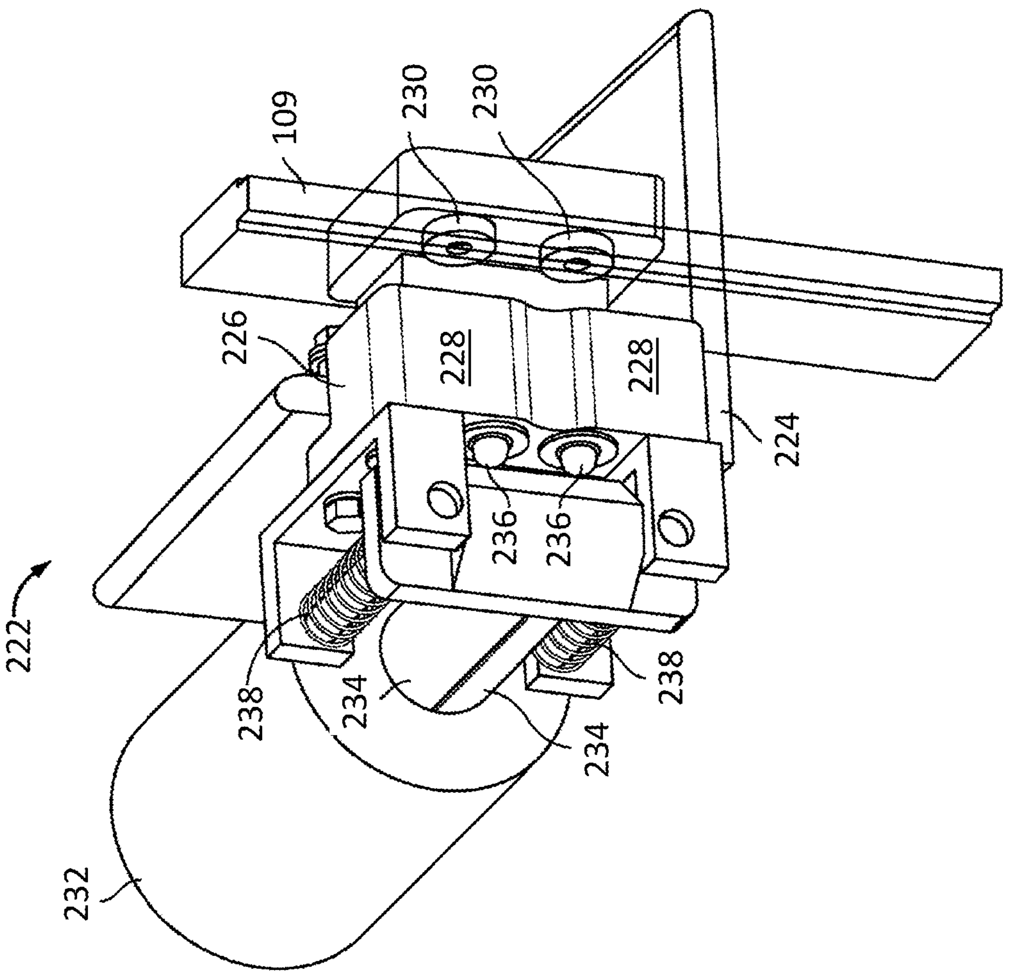
FIG. 2 is a perspective view of a braking assembly of an elevator system in accordance with embodiments.

With reference to FIG. 2, the elevator car 103 of FIG. 1 can also include a braking assembly 222. The braking assembly 222 is secured to the elevator car 103 by support 224 and includes a caliper 226 having one or more brake pads 228. The brake pads 228 are movable to engage the guide rail 109 between the brake pads 228 and one or more braking pads 230 on the opposite side of the guide rail 109. In some embodiments, the brake pads 228 are movable via a braking actuator 232. The braking actuator 232 may be, for example, a solenoid, a linear motor, or other type of actuator. The braking actuator 232 includes one or more braking actuator plungers 234 extending toward one or more brake pad pins 236.

When the braking actuator 232 is energized, such as during operation of the elevator system 101 of FIG. 1, the braking actuator plungers 234 are drawn into the braking actuator 232. When it is desired to activate the braking assembly 222, the braking actuator 232 is de-energized such that one or more plunger springs 238 bias the braking actuator plungers 234 outwardly, away from the braking actuator 232 and toward and into an extended position. As the braking actuator plungers 234 move outwardly, the braking actuator plungers 234 come into contact with the brake pad pins 236 and urge the brake pad pins 236 toward the guide rail 109. The brake pad pins 236 in turn move the brake pads 228 into contact with the guide rail 109 and slow and/or stop movement of the elevator car 103 relative to the guide rail 109 by frictional forces between the brake pads 228 and the guide rail 109 and between the braking pads 230 and the guide rail 109. To deactivate the braking assembly 222, the braking actuator 232 is energized, drawing the braking actuator plungers 234 into the braking actuator 232, overcoming the bias of the plunger springs 38 and thus allowing the brake pads 228 to move away from the guide rail 109.

Although the braking assembly 222 is described herein as being coupled to or provided as a component of the elevator car 103, it is to be understood that other embodiments and configurations are possible. For example, a braking assembly could be coupled to or provided as a component of the driving machine 111. The following description will relate to any and of these alternative embodiments and configurations.

With reference to FIGS. 3-6, where the elevator system 101 of FIG. 1 includes the elevator car 103 and the driving machine 111 and the elevator car 103 includes the braking assembly 222 of FIG. 2, the elevator system 101 further includes a control system 301. The control system 301 is configured to react to an incident requiring engagement of at least one of primary and secondary brakes (to be described below as either the driving machine 111 and the braking assembly 222 or vice versa, respectively) to decelerate upward and downward movements of the elevator car 103 in effect and to actively control a deceleration rate during the incident. The control system 301 accomplishes such deceleration rate control by operating the driving machine 111 or the braking assembly 222 as the primary brake, determining whether the deceleration rate is within a target range and operating the other of the driving machine 111 or the braking assembly 222 as the secondary brake in an event the deceleration rate is outside the target range.

The control system 301 includes a sensor system 302, a safety system signaling element 303 and/or a communication link 304. The sensor system 302 is configured to sense a condition of the elevator car 103 and can be provided as one or more of an encoder, an accelerometer, a laser, optical or sonar measuring device, a motor current sensor, etc. The safety system signaling element 303 may be configured to generate a safety signal that is indicative of the incident. The communication link 304 is configured to communicate elevator system information, such as a floor location, door or floor zone information, run types, drive fault information, etc., to the elevator car 103. The safety system signaling element 303 could also provide the elevator system information to the elevator car 103 in accordance with alternative embodiments. The control system 301 may further include brake command unit 305, which is configured to generate a brake command separate and apart from any other brake command generated by the control system 301.

In addition, the control system 301 includes a safety controller 310. The safety controller 310 includes a calculation unit 311 that is receptive of elevator car condition data from the sensor system 302 and a safety monitor and control logic unit 312 that is receptive of the safety signal from either the safety system signaling element 303 or the communication link 304, the elevator system information from the communication link 304 and the brake command from either the brake command unit 305 or the communication link 304. The safety controller 310 operates the driving machine 111 and the braking assembly 222 in accordance with the elevator car condition data, the safety signal indicative of the incident and the elevator system information.

Figure 3:
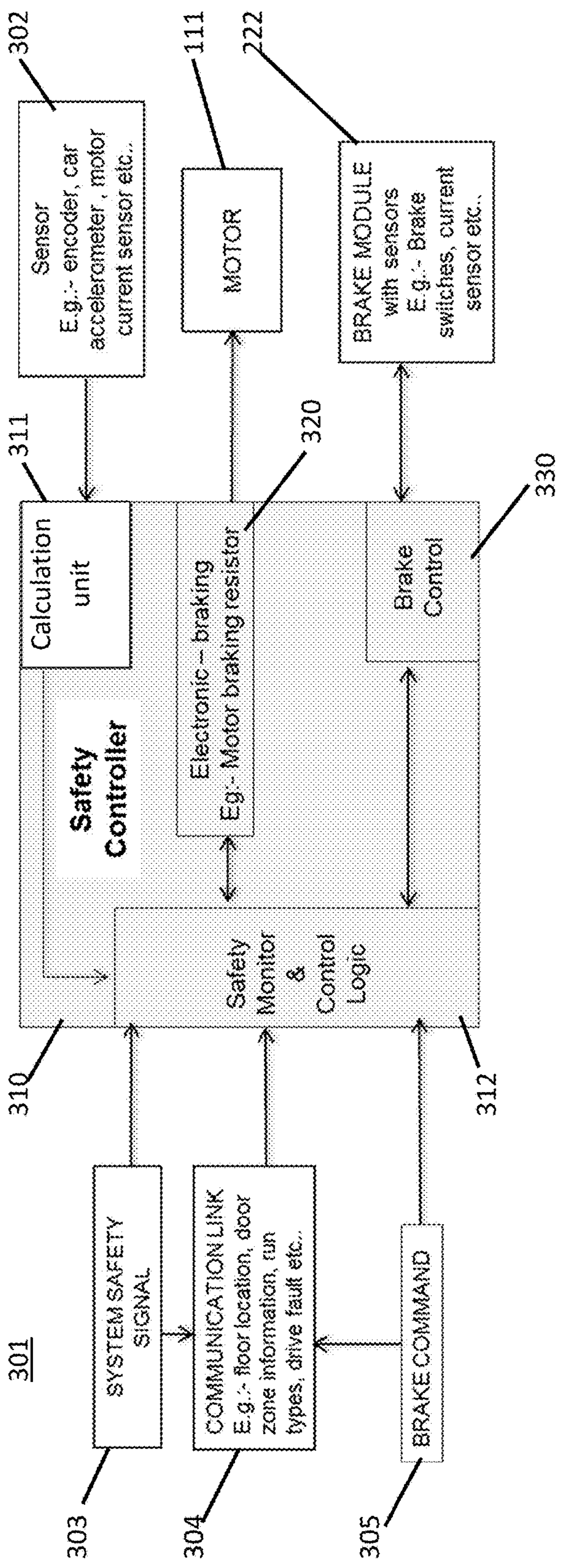
FIG. 3 is a schematic illustration of a control system of an elevator system in accordance with embodiments.

As shown in FIG. 3, the safety controller 310 further includes an electronic braking unit 320, which is configured to operate the driving machine 111 as the primary or secondary brake, and a brake control unit 330, which is configured to operate the braking assembly 222 as the primary or secondary brake. In this case, the safety monitor and control logic unit 312 determine which of the driving machine 111 and the braking assembly 222 is to be operated as the primary brake and which of the driving machine 111 and the braking assembly 222 is to be operated as the secondary brake. In addition, the safety monitor and control logic unit 312 is configured to control the electronic braking unit 320 and the brake control unit 330 in accordance with at least one of a velocity, an acceleration and a deceleration calculated by the calculation unit, the safety signal, the elevator system information and a brake command.

Thus, in an event the driving machine 111 was provided as the primary brake and the braking assembly 222 was provided as the secondary brake, the driving machine 111 would be engaged by the electronic braking unit 320 to slow down an upward or downward movement of the elevator car 103 when an incident requiring elevator car stoppage is in effect. At this point, a deceleration rate of the elevator car 103 could be sensed by the sensor system 302. If the deceleration rate is sensed to be excessive and thus uncomfortable for passengers, the operation of the driving machine 111 could be adjusted by the electronic braking unit 320. Conversely, if the deceleration rate is sensed to be too slow in stopping the elevator car 103 given the nature of the incident, the braking assembly 222 could be engaged by the brake control unit 330 to increase the deceleration rate. If the deceleration rate thus increases to a point at which passenger discomfort is risked, a determination could made as to whether it is necessary to take the risk in order to achieve elevator car stoppage.

It is to be understood that a person of ordinary skill in the art would recognize that the operations described above could be switched in an event the braking assembly 222 was provided as the primary brake and the driving machine 111 was provided as the secondary brake. As such, that case does not need to be described in further detail.

In an exemplary case, the primary brake can be operated to slow down the elevator car 103 and could be provided as the driving machine 111 or the brake assembly 222 with the secondary brake being provided as the brake assembly 222 or the driving machine 111. If the primary brake is the brake assembly 222 and the brake assembly 222 were configured in a dual brake configuration with its own primary and secondary controls, the driving machine 111 might not actually be required. On the other hand, the driving machine 111 could be configured as a set of resistors across 3-phase windings of a motor, a set of switches or diodes across all of the 3-phase windings, a single switch (e.g., an IGBT) and a resistor, which could be provided as a motor winding itself. Here, a "system safety signal" could be a physical input or a logic input through the communication link 304 whereas a "brake command" could be a physical input or a logic input through the communication link 304.

Figure 4:
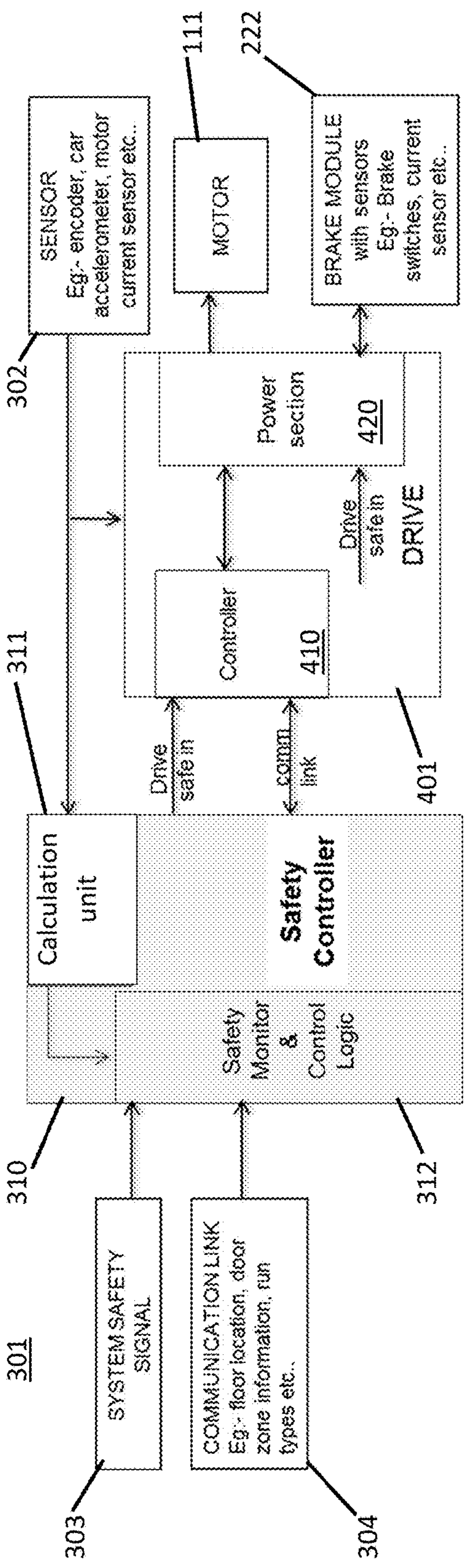
FIG. 4 is a schematic illustration of a control system of an elevator system in accordance with embodiments.

As shown in FIG. 4, the control system 301 further includes a drive component 401. The drive component 401 includes a controller 410, which is receptive of a "drive safe in" signal and a communication link signal, and a power section 420, which is operable by the controller 410 to control operations of the driving machine 111 and the braking assembly 222.

In the embodiments of FIG. 4, the safety controller 310 generally operates in a similar manner as described above with respect to FIG. 3 except that the driving machine 111 will typically be provided as the primary brake and the braking assembly 222 will typically be provided as the secondary brake and will be engaged in an event the driving machine 111 cannot be used to achieve a sufficient deceleration rate in a given incident.

Figure 5:
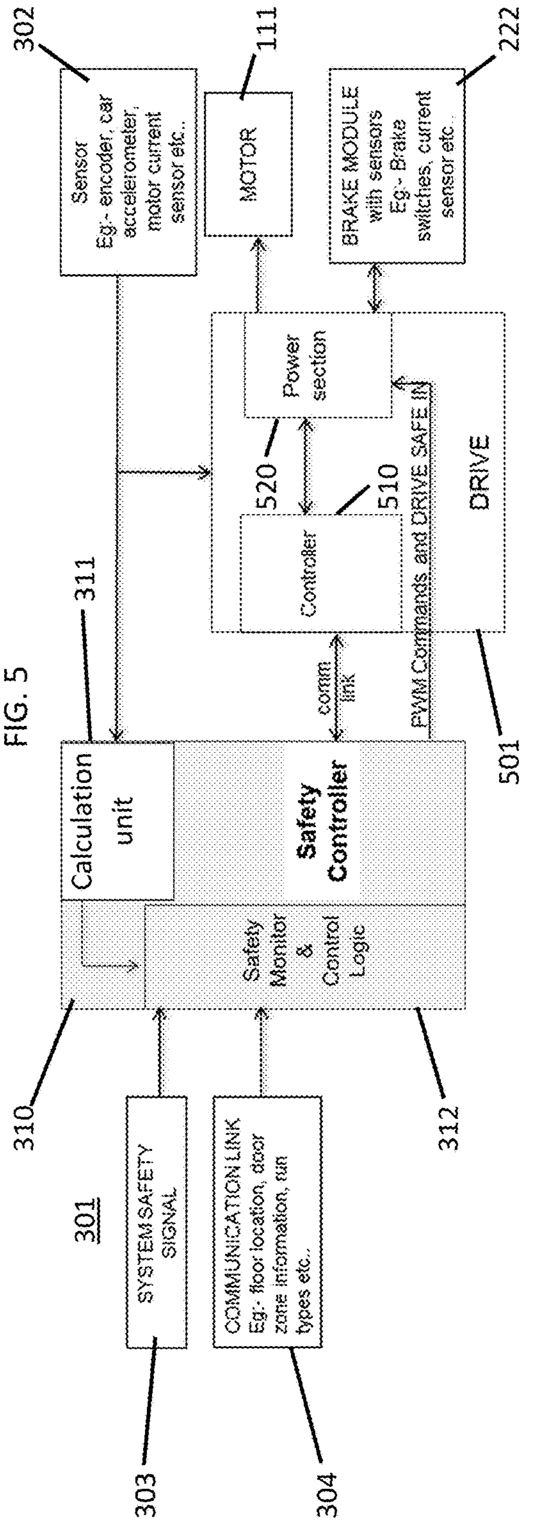
FIG. 5 is a schematic illustration of a control system of an elevator system in accordance with embodiments.

As shown in FIG. 5, the control system 301 further includes a drive component 501. The drive component 501 includes a controller 510, which is receptive of a communication link signal, and a power section 520, which is receptive of a pulse width modulation (PWM) signal from the safety controller 310 and which is operable by the safety controller 310 and the controller 510 to control operations of the driving machine 111 and the braking assembly 222.

In the embodiments of FIG. 5, the safety controller 310 generally operates in a similar manner as described above with respect to FIG. 3 except that during normal operations, the power section 520 is operated by the controller 510 but if an emergency stop is detected, the power section 520 is operated by the safety controller 310. Again, the driving machine 111 will typically be provided as the primary brake and the braking assembly 222 will typically be provided as the secondary brake and will be engaged in an event the driving machine 111 cannot be used to achieve a sufficient deceleration rate in a given incident.

Figure 6:
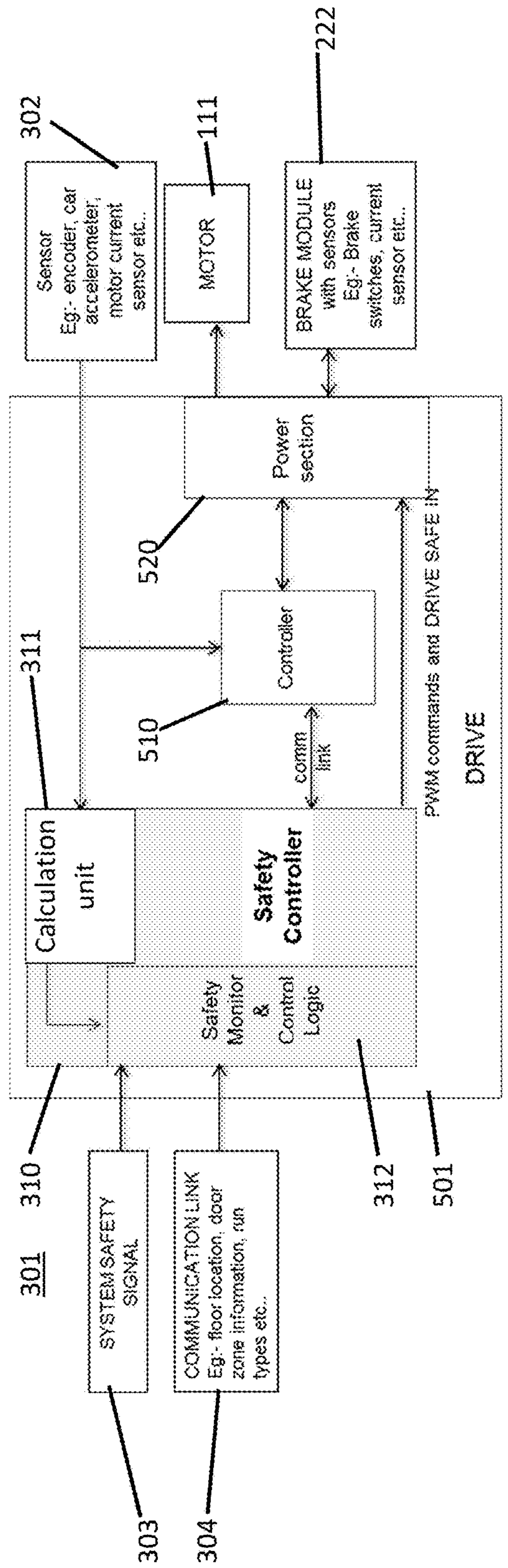
FIG. 6 is a schematic illustration of a control system of an elevator system in accordance with embodiments.

As shown in FIG. 6, the safety controller 310 could reside in the drive component 501 along with the controller 510 and the power section 520.

In accordance with additional or alternative embodiments, it is to be understood that the brake module 222 of FIGS. 4-6 in particular could be controlled by another external device instead of the drive component 401 of FIG. 4 or the drive component 501 of FIGS. 5 and 6.

With regard to FIGS. 3-6 various controllers and components are referenced, however it would be understood by one of ordinary skill in the art that the controllers and components may be combined into fewer components and/or controllers, or further divided into more controllers and/or components and that the components and controllers are shown in the drawings to reflect logical functions and not necessarily physical components.

Figure 7:
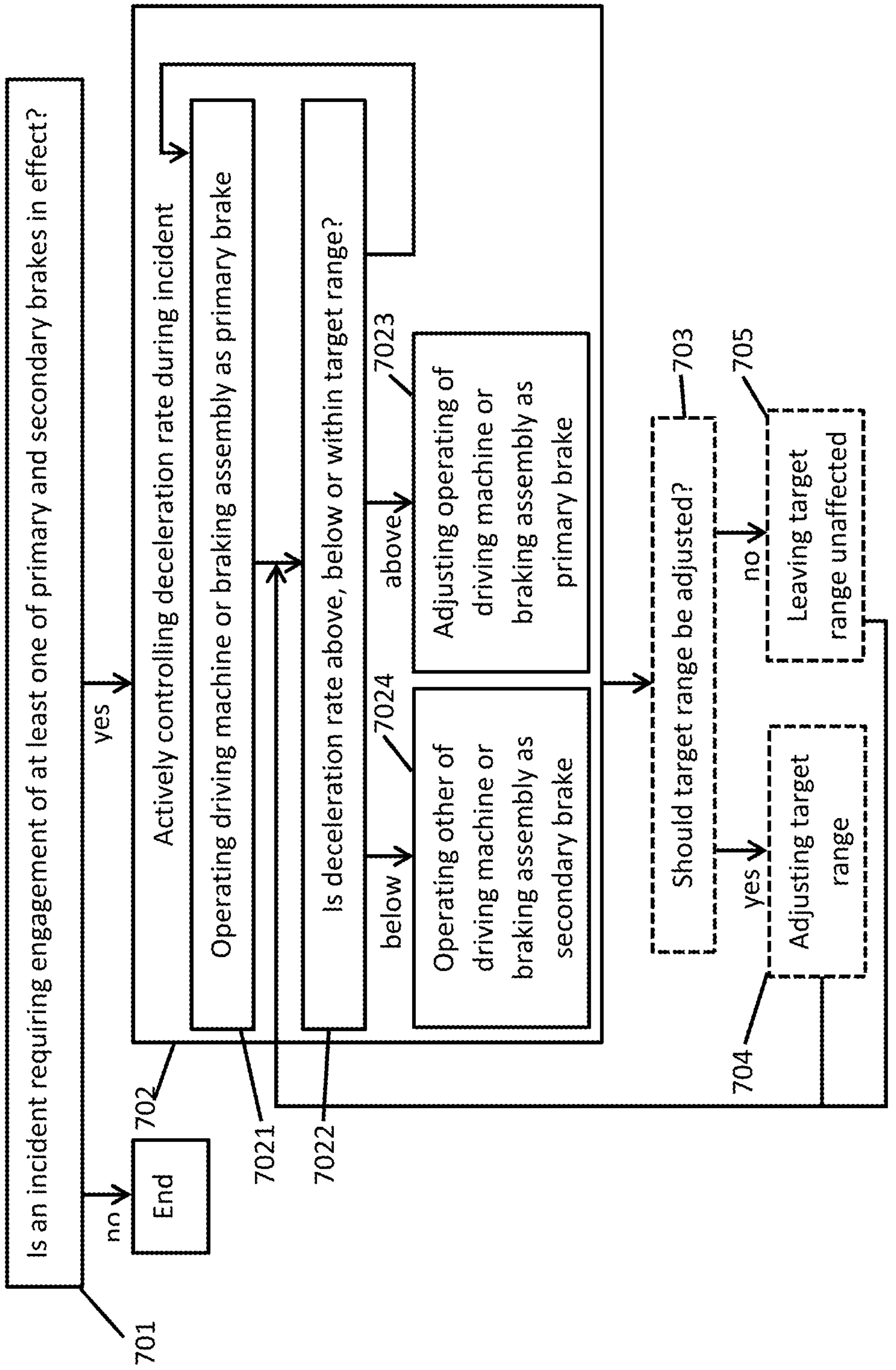
FIG. 7 is a flow diagram illustrating a method of operation of an elevator control system in accordance with embodiments.

With reference to FIG. 7, a method of operating an elevator system is provided and includes determining whether an incident requiring engagement of at least one of primary and secondary brakes to decelerate elevator car movements is in effect (701) and actively controlling a deceleration rate during the incident (702) to, for example, stop the elevator car at a landing. The active control is achieved by operating a driving machine or a braking assembly as the primary brake (7021), determining whether the deceleration rate is within a target range (7022), adjusting the operating of the driving machine or the braking assembly as the primary brake in an event the deceleration rate is above the target range (7023) and operating the other of the driving machine or the braking assembly as the secondary brake in an event the deceleration rate is below the target range (7024). The method may further include optional operations of determining whether the target range should be adjusted (703) and accordingly adjusting the target range (704) or leaving the target range unaffected (705).

Technical effects and benefits of the present disclosure are the improvement in the ride provided by an elevator system in the event of an immediate stop.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An elevator system control system, comprising:

a sensor system configured to sense elevator car conditions;

a safety system signaling element to generate a safety signal indicative of an incident;

a driving machine;

a braking assembly;

a drive component which comprises a controller receptive of elevator car condition data and a power section configured to normally operate the driving machine and the braking assembly autonomously; and a control system comprising a safety controller that resides in the drive component and that operates primary and secondary brakes in accordance with elevator car condition data and the safety signal, the control system being configured to react to the safety signal;

wherein, in response to the control system receiving the safety signal indicating that an incident has occurred that requires engagement of at least one of the primary brake and the secondary brake, the control system controls a deceleration rate during the incident by:

determining which of the driving machine and the braking assembly is to be operated as the primary brake and the secondary brake, operating the primary brake in accordance with the determining, determining whether the deceleration rate is above, below or within a target range, and, with the primary brake remaining the primary brake and the secondary brake remaining the secondary brake, adjusting the deceleration rate based on signals from the sensor system by adjusting the operating of the primary brake when the deceleration rate is determined to be above the target range and by operating the secondary brake when the deceleration rate is determined to be below the target range.

2. The elevator system according to claim 1, wherein the safety controller comprises:

a calculation unit to calculate a velocity, an acceleration and a deceleration of the elevator car in accordance with the elevator car condition data;

an electronic braking unit to operate the driving machine as the primary or secondary brake;

a brake control unit to operate the braking assembly as the primary or secondary brake; and a safety monitor and control logic unit to execute the determining of which of the driving machine and the braking assembly is to be operated as the primary and the secondary brake and to control the electronic braking unit and the brake control unit in accordance with calculations of the calculation unit, the safety signal, elevator system information and a brake command.

3. The elevator system according to claim 1, wherein:

the safety controller comprises a calculation unit to calculate a velocity, an acceleration and a deceleration of the elevator car in accordance with the elevator car condition data and a safety monitor and control logic unit which is receptive of calculations of the calculation unit, the safety signal and elevator system information, and the safety controller instructs the power section during an emergency incident in accordance with the calculations of the calculation unit, the safety signal and the elevator system information to operate the driving machine and the braking assembly as the primary or the secondary brake.

4. The elevator system according to claim 1, wherein the target range is adjustable.

5. An elevator system, comprising:

an elevator car;

a driving machine to drive elevator car movements;

a braking assembly to apply a braking force in opposition to the elevator car movements; and a control system comprising a safety controller, which resides in a drive component comprising a controller receptive of elevator car condition data and a power section configured to normally operate the driving machine and the braking assembly autonomously, the control system being configured to control a deceleration rate during an incident requiring engagement of at least one of primary and secondary brake to decelerate the elevator car movements by:

determining which of the driving machine and the braking assembly is to be operated as the primary brake and the secondary brake, operating the driving machine or the braking assembly as the primary brake in accordance with the determining, determining whether the deceleration rate is above, below or within a target range, and adjusting the deceleration rate in response to the deceleration rate being outside the target range by adjusting the operating of the primary brake when the deceleration rate is determined to be above the target range and by operating the secondary brake when the deceleration rate is determined to be below the target range.

6. The elevator system according to claim 5, wherein the control system comprises:

a sensor system configured to sense a condition of the elevator car; and a safety system signaling element to generate a safety signal indicative of the incident.

7. The elevator system according to claim 5, wherein the safety controller operates the driving machine and the braking assembly in accordance with the elevator car condition data, a safety signal indicative of the incident and elevator system information.

8. The elevator system according to claim 5, wherein the safety controller comprises:

a calculation unit to calculate a velocity, an acceleration and a deceleration of the elevator car in accordance with the elevator car condition data;

an electronic braking unit to operate the driving machine as the primary or secondary brake;

a brake control unit to operate the braking assembly as the primary or secondary brake; and a safety monitor and control logic unit to execute the determining of which of the driving machine and the braking assembly is to be operated as the primary and the secondary brake and to control the electronic braking unit and the brake control unit in accordance with calculations of the calculation unit, a safety signal, elevator system information and a brake command.

9. The elevator system according to claim 5, wherein:

the safety controller comprises a calculation unit to calculate a velocity, an acceleration and a deceleration of the elevator car in accordance with the elevator car condition data and a safety monitor and control logic unit which is receptive of calculations of the calculation unit, a safety signal and elevator system information, and the safety controller instructs the power section during an emergency incident in accordance with the calculations of the calculation unit, the safety signal and the elevator system information to operate the driving machine and the braking assembly as the primary or the secondary brake.

10. The elevator system according to claim 5, wherein the target range is adjustable.

11. A method of operating a control system of an elevator system, the control system comprising a safety controller which resides in a drive component comprising a controller receptive of elevator car condition data and a power section configured to normally operate a driving machine and a braking assembly autonomously, the method comprising:

actively controlling a deceleration rate during an incident that requires engagement of at least one of primary and secondary brake to decelerate an elevator by:

determining which of the driving machine and the braking assembly is to be operated as the primary brake and the secondary brake, operating the one of the driving machine and the braking assembly as the primary brake in accordance with the determining, determining whether the deceleration rate is above, below or within a target range, and adjusting the deceleration rate in response to the declaration rate being outside the target range by adjusting the operating of the primary brake when the deceleration rate is determined to be above the target range and by operating the secondary brake when the deceleration rate is determined to be below the target range.

12. The method according to claim 11, wherein the active controlling comprises stopping the elevator at a landing.

13. The method according to claim 11, further comprising determining that the incident is in effect, the determining comprising:

sensing a condition of the elevator car;

generating a safety signal indicative of the incident; and communicating elevator system information to the elevator car.

14. The method according to claim 11, wherein the target range is adjustable.

* * * * *